US012670084B2

(12) United States Patent
Sankhe et al.

(10) Patent No.: US 12,670,084 B2
(45) Date of Patent: Jun. 30, 2026

(54) MITIGATION OF DATA LOSS FROM TRACE SAMPLING

(71) Applicant: Cisco Technology, Inc., San Jose, CA (US)

(72) Inventors: Najuka Prakash Sankhe, San Jose, CA (US); Jaideep Padhye, San Jose, CA (US); Tom Thekkel Jose, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/630,265

(22) Filed: Apr. 9, 2024

(65) Prior Publication Data

US 2025/0315361 A1 Oct. 9, 2025

(51) Int. Cl.
*G06F 11/34* (2006.01)
*H04L 43/045* (2022.01)
*H04L 43/10* (2022.01)

(52) U.S. Cl.
CPC ........ *G06F 11/3466* (2013.01); *H04L 43/045* (2013.01); *H04L 43/10* (2013.01)

(58) Field of Classification Search
CPC ........................... G06F 11/3466; H04L 43/045
See application file for complete search history.

(56) References Cited

U.S. PATENT DOCUMENTS

| | | | | | |
|---|---|---|---|---|---|
| 9,846,632 | B2 * | 12/2017 | Liu | .................... | G06F 11/3082 |
| 10,102,108 | B2 * | 10/2018 | Araya | ................. | G06F 11/3644 |
| 10,169,434 | B1 * | 1/2019 | Block | ................. | G06F 16/2228 |
| 10,642,852 | B2 * | 5/2020 | Marquardt | ............ | G06F 16/901 |
| 10,726,009 | B2 * | 7/2020 | Pal | ..................... | G06F 16/24554 |
| 10,748,099 | B1 | 8/2020 | Sadowski et al. | | |
| 10,880,191 | B1 * | 12/2020 | Kant | ................... | G06F 11/3466 |
| 11,030,068 | B1 * | 6/2021 | Agarwal | .............. | G06F 11/327 |
| 11,119,843 | B2 * | 9/2021 | Brown | ................ | G06F 11/0709 |
| 11,210,156 | B1 * | 12/2021 | Liu | ..................... | G06F 11/0739 |
| 11,526,413 | B2 * | 12/2022 | Barnsteiner | ............. | H04L 43/10 |
| 11,556,456 | B2 * | 1/2023 | Lewis | ................. | G06F 11/3072 |
| 11,907,212 | B1 * | 2/2024 | Hamilton | ............ | G06F 16/2448 |
| 12,111,743 | B2 * | 10/2024 | Larkin | ................ | G06F 11/3089 |
| 2015/0019537 | A1 * | 1/2015 | Neels | ................. | G06F 16/9535 707/722 |

(Continued)

OTHER PUBLICATIONS

Apollo: "Connecting OpenTelemetry Traces to Prometheus", retrieved from https://www.apollographql.com/docs/technotes/TN0003-opentelemetry-traces-to-prometheus on Feb. 13, 2024, 5 Pages.

(Continued)

*Primary Examiner* — G. C. Neurauter, Jr.

(74) *Attorney, Agent, or Firm* — Merchant & Gould P.C.; Kenneth J. Heywood

(57) ABSTRACT

In one implementation, a device may obtain a set of Open-Telemetry data generated by instrumenting an online application. The device may form a group of OpenTelemetry data associated with a common event and comprising at least a portion of the set of OpenTelemetry data. The device may derive, using the group of OpenTelemetry data, information for display to a user interface regarding the event. The device may provide the group of OpenTelemetry data for sampling, after deriving the information for display.

20 Claims, 10 Drawing Sheets

700

```
service:
    extension:
        - oauth2client/appd
    pipelines:
        # Trace pipeline to generate BiQ event from traces/spans
        traces:
            receivers:
                - otlp
            exporters:
                - BiQconnector
            # Logs pipeline to process BiQ events ingest logs to fso
        logs:
            receivers:
                - BiQconnector
            processor:
                - groupbyattrs/grouping
                - batch
                - groupbyattrs/compaction
            exporters:
                - oltphttp/levitate
```

(56) References Cited

U.S. PATENT DOCUMENTS

| | | | | |
|---|---|---|---|---|
| 2018/0285240 A1* | 10/2018 | Kou | .................... | G06F 11/3644 |
| 2020/0372007 A1 | 11/2020 | Ross et al. | | |
| 2020/0394329 A1 | 12/2020 | Jayaprakash et al. | | |
| 2020/0409933 A1 | 12/2020 | Ertl | | |
| 2021/0279632 A1* | 9/2021 | Di Pietro | .............. | G06N 20/00 |
| 2022/0398603 A1 | 12/2022 | Manivannan et al. | | |
| 2023/0300152 A1* | 9/2023 | Brancato | ............ | H04L 63/1425 |
| | | | | 726/23 |
| 2024/0143471 A1* | 5/2024 | Martella | ............... | H04L 41/069 |
| 2024/0303172 A1* | 9/2024 | Larkin | ................. | G06F 11/324 |
| 2024/0386074 A1* | 11/2024 | Ressler | .................. | G06F 17/18 |

OTHER PUBLICATIONS

Opentelemetry: "Building a Connector", retrieved from https://opentelemetry.io/docs/collector/building/connector/ on Feb. 13, 2024, 14 Pages.
Opentelemetry: "Scaling the Collector", retrieved from https://opentelemetry.io/docs/collector/scaling/ on Apr. 1, 2024, 9 Pages.
Simons H., "An Introduction to Trace Sampling with Grafana Tempo and Grafana Agent", Grafana Labs, May 11, 2022, retrieved from https://grafana.com/blog/2022/05/11/an-introduction-to-trace-sampling-with-grafana-tempo-and-grafana-agent/ on Feb. 13, 2024, 19 Pages.

* cited by examiner

```
service:
  extension:
    - oauth2client/appd
  pipelines:
    # Common pipeline group by traces and generate BiQ event
    traces:
      receivers:
        - otlp
      processors:
        - groupbytrace
      exporters:
        - BiQconnector
        - forward
    # Pipeline for trace tail sampling and ingesting traces to fso
    traces/2:
      receivers:
        - forward
      processors:
        - tail_sampling
      exporters:
        - oltphttp/levitate
    # Logs pipeline to ingest logs to fso
    logs:
      receivers:
        - BiQconnector
      processor:
        - BiQTransform
      exporters:
        - oltphttp/levitate
```

```
service:
  extension:
    - oauth2client/appd
  pipelines:
    # Trace pipeline to generate BiQ event from traces/spans
    traces:
      receivers:
        - otlp
      exporters:
        - BiQconnector
    # Logs pipeline to process BiQ events ingest logs to fso
    logs:
      receivers:
        - BiQconnector
      processor:
        - groupbyattrs/grouping
        - batch
        - groupbyattrs/compaction
      exporters:
        - oltphttp/levitate
```

800

```
processor:
  - attributes:
    actions:
      - key: attribute1
        action: delete
      - key: attribute2
        action: delete
```

1000

START
1005

OBTAIN A SET OF OPENTELEMETRY DATA GENERATED BY INSTRUMENTING AN ONLINE APPLICATION
1010

FORM A GROUP OF OPENTELEMETRY DATA ASSOCIATED WITH A COMMON EVENT
1015

DERIVE INFORMATION FOR DISPLAY TO A USER INTERFACE REGARDING THE EVENT
1020

PROVIDE THE GROUP OF OPENTELEMETRY DATA FOR SAMPLING, AFTER DERIVING THE INFORMATION FOR DISPLAY
1025

END
1030

MITIGATION OF DATA LOSS FROM TRACE SAMPLING

TECHNICAL FIELD

The present disclosure relates generally to mitigation of data loss from trace sampling.

BACKGROUND

Application performance monitoring (APM) techniques have emerged as a critical component in ensuring the optimal performance and reliability of modern applications. Indeed, such techniques provide insights into the behavior of the application, performance bottlenecks, and potential issues that can impact the user experience and/or stability of the system. This is typically done by capturing and monitoring traces, which are detailed records of the requests made within the application across its various (micro-) services, components, and the like.

However, the sheer volume of trace data generated by modern applications can be too resource intensive for an APM solution to capture and assess every possible trace. This reality has led to the widespread adoption of sampling strategies to effectively manage data collection and analysis. Sampling traces, though, come at the price of data loss. Indeed, the selective capture of trace data, while beneficial for operational efficiency, can inadvertently lead to the omission of crucial information regarding specific transactional performance metrics. As a result, a tradeoff is often made whereby users must sacrifice accurate insights into how the application's performance is impacting transactional performance metrics, to maintain predictable operational costs and prevent excessive resource consumption by the APM solution.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 5 illustrates an example of a pipeline configuration for mitigation of data loss from trace sampling;

DESCRIPTION OF EXAMPLE IMPLEMENTATIONS

Overview

According to one or more implementations of the disclosure, device may obtain a set of OpenTelemetry data generated by instrumenting an online application. The device may form a group of OpenTelemetry data associated with a common event and comprising at least a portion of the set of OpenTelemetry data. The device may derive, using the group of OpenTelemetry data, information for display to a user interface regarding the event. The device may provide the group of OpenTelemetry data for sampling, after deriving the information for display.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
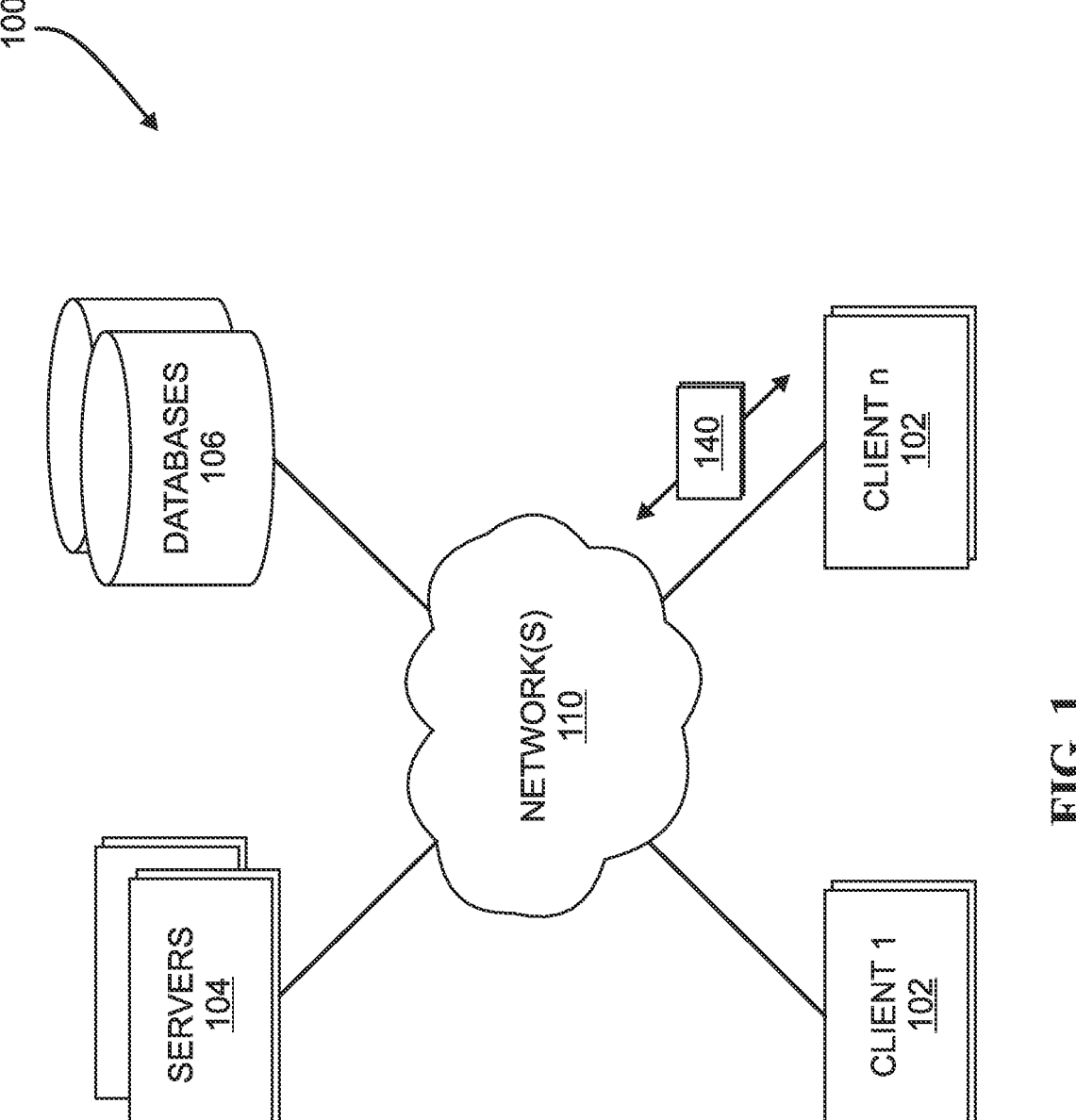
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
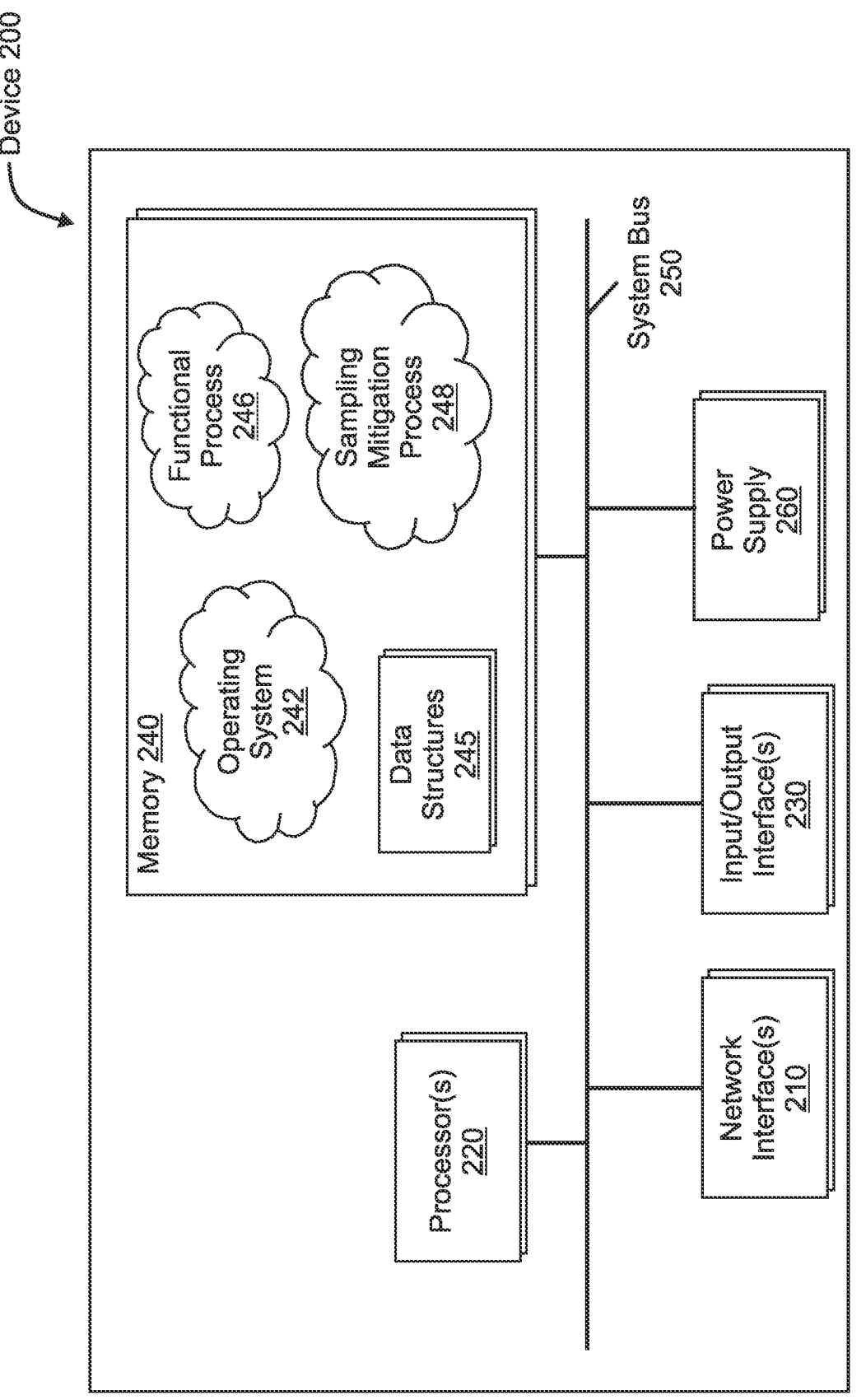
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an illustrative process such as sampling mitigation process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, sampling mitigation process 248 may include computer executable instructions that, when executed by processor 220, cause device 200 to perform the techniques described herein. To do so, in some implementations, sampling mitigation process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, Mis a statistical model, and the cost function is inversely proportional to the likelihood of M, given the input data.

In various implementations, sampling mitigation process 248 may employ one or more supervised, unsupervised, or semi-supervised machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that sampling mitigation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, sampling mitigation process 248 may also include, or otherwise use, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, sampling mitigation process 248 may use a generative model to generate configurations based on a conversational input from a user (e.g., voice, text, etc.). In another example, sampling mitigation process 248 may utilize a generative model with a method invocation data collector (MIDC) to assist in automated or manual identification of transactional attributes for spans. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
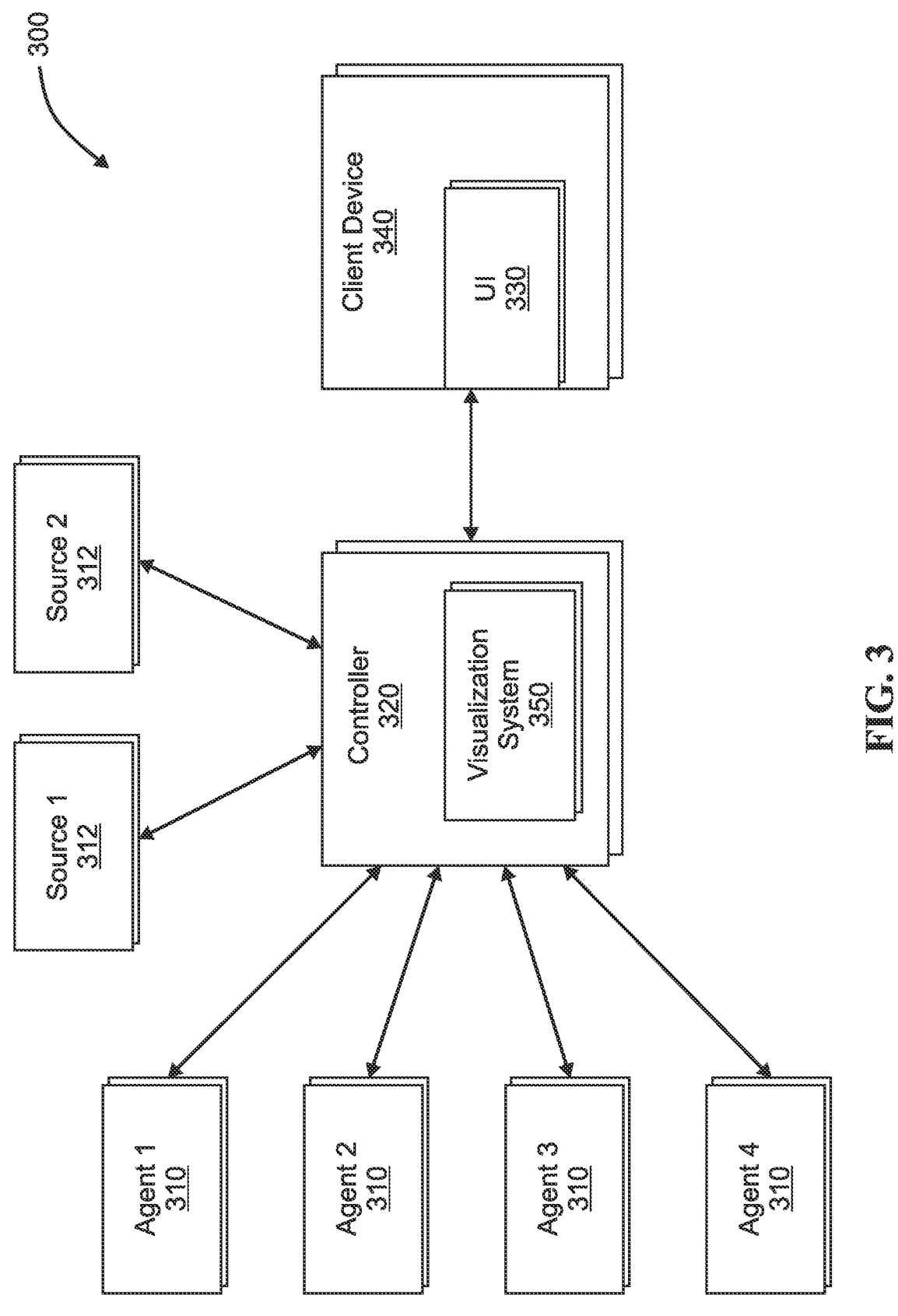
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a user interface 330 (denoted UI in FIG. 3), such as a browser-based UI, that is the primary interface for monitoring, analyzing, and troubleshooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one implementation, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally. Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

As noted above, the introduction of APM sampling has been problematic for utilities that provide transactional performance insights based on transactional attribute data from traces. For example, transactional attribute data may be included in transaction spans which are then used to derive transactional performance metrics. Therefore, implementing a partial sampling strategy, such as head or tail sampling, to save on operational costs translates to a loss of the data from the non-sampled traces resulting in inaccurate or incomplete transaction performance insights. However, disabling sampling altogether is not an option as it prevents users from having predictable operational costs associated with application performance monitoring. Conventional approaches to APM do not have a mechanism whereby the transactional performance attributes may be retained at the transactional level while still allowing implementation of sampling strategies of APM traces. Consequently, the conventional approaches to APM provide incomplete transactional visibility and/or potentially biased data that create difficulties and delays in identifying and diagnosing issues. These deficiencies may result in APM system and monitored application performance and user experience as well as increased operational risks such as system failures, security breaches, compliance issues, financial losses, reputational damage, etc.

Mitigation of Data Loss from Trace Sampling

In contrast, the techniques described herein mitigate data loss associated with trace sampling by allowing users to sample traces yet retain all the transactional attributes to provide full data granularity necessary to provide accurate transactional performance insights. Specifically, these techniques introduce a connector component that can process trace data before ingestion. Therefore, even when a user enables sampling, events are ingested before sampling and none of the transactional attribute data are lost. This level of transactional data granularity delivers consistently accurate transactional metric analytics and insights.

Illustratively, the techniques described herein may be performed by hardware, software, and/or firmware, such as in accordance with sampling mitigation process 248, which may include computer executable instructions executed by the processor 220 (or independent processor of interfaces 210) to perform functions relating to the techniques described herein.

Specifically, according to various implementations, device may obtain a set of OpenTelemetry data generated by instrumenting an online application. The device may form a group of OpenTelemetry data associated with a common event and comprising at least a portion of the set of OpenTelemetry data. The device may derive, using the group of OpenTelemetry data, information for display to a user interface regarding the event. The device may provide the group of OpenTelemetry data for sampling, after deriving the information for display.

Figure 4:
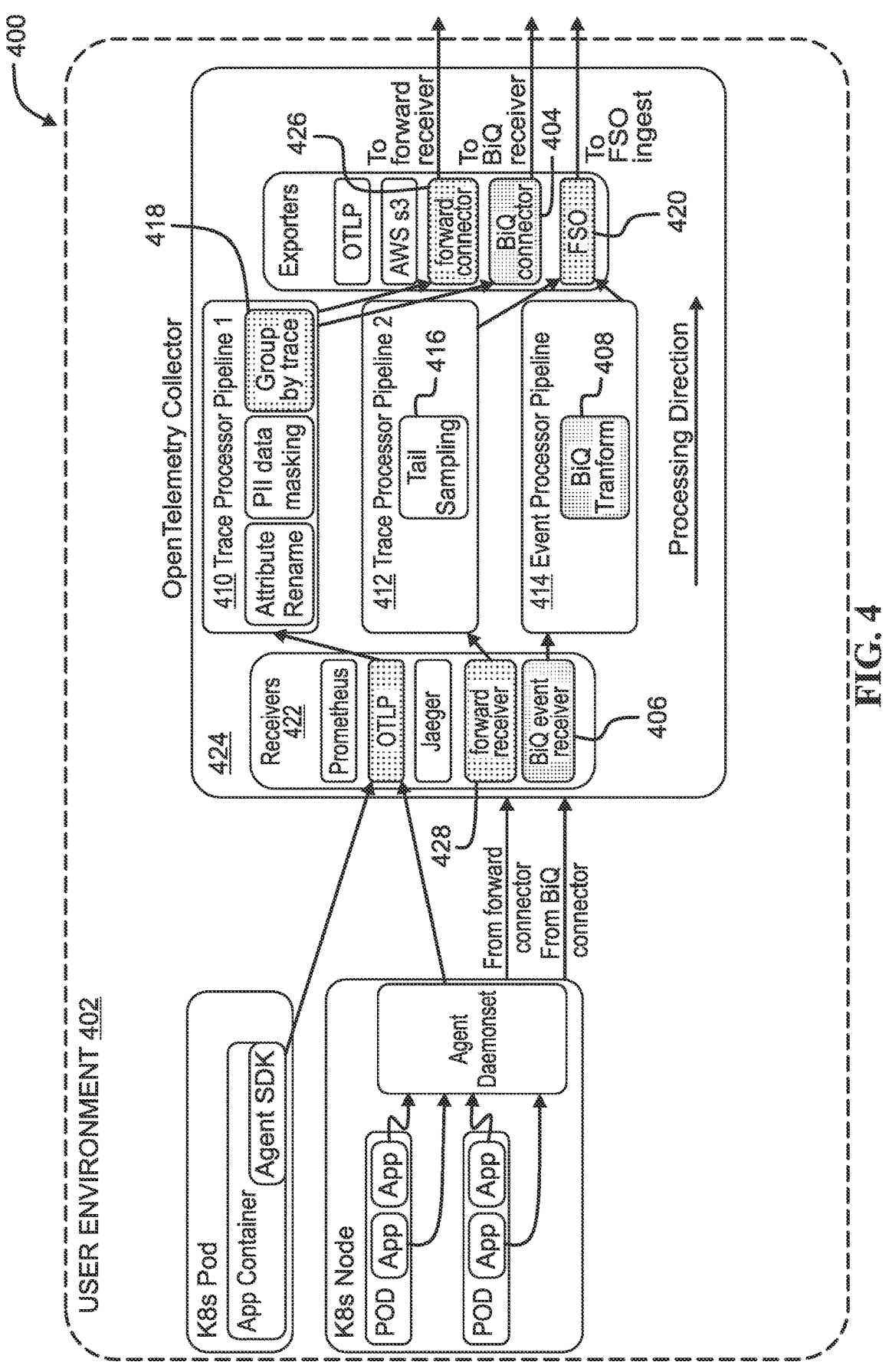
FIG. 4 illustrates an example of an architecture for mitigation of data loss from tail-based sampling of traces.

Operationally, FIG. 4 illustrates an example of an architecture 400 for mitigation of data loss from tail-based sampling of traces. As outlined above, in cloud native application observability approached, transactional attributes associated with application processes executing in user environment 402 may be attached to spans. The transactional attributes attached to these spans may be utilized to derive transactional performance metrics. Additionally, the raw events generated may be utilized to build transactional workflow journeys and transactional funnel visualization. The components of architecture 400 may be utilized to implement sampling strategies that facilitate full-granularity retention of the transactional attributes at the transaction level while still allowing sampling of APM traces.

Conventional observability protocols (e.g., OpenTelemetry (OTel)) deployments support head-based or tail-based sampling of traces from user environment 402. Architecture 400 is configured to facilitate mitigation of data loss from such tail-based sampling of traces. Specifically, architecture 400 may implement event_generator connector components (e.g., connector 404, event receiver 406, transformer 408, etc.) and a multi-pipeline configuration to achieve this mitigation of data loss from trace sampling. This may be implemented within a conventional protocol connector (e.g., OTel connector) which is configured to collect traces and/or cause telemetry data to be generated from those traces.

In architecture 400, connector 404 may process trace data before ingestion. Connector 404 may be configured to form event payloads tailored for APM and/or FSO-specific platforms (e.g., AppDynamics, etc.), with relevant transactional attributes set in the event payload. Further, the event can be mapped to the transaction entities by calculating the transaction ID and setting it as one of the attributes of the event payload. Transaction entity ID calculation may be performed based on the transaction name, service name, service namespace, etc.

In architecture 400, connector 404 may generate events from traces. Similarly, it may also generate the events from metrics or logs. Architecture 400 may also include multiple logical pipelines to logically compartmentalize event generation from sampling operations among multiple pipelines for ingesting the traces and logs to an FSO platform. For instance, architecture 400 may include two trace pipelines (e.g., first trace pipeline 410 and second trace pipeline 412) in addition to an event processor pipeline 414, which demonstrates how trace sampling is not impacting event generation and/or how events may be received for all the traces. Moreover, architecture 400 may include a transformer 408 configured to enhance and/or transform the event (e.g., by masking sensitive data, adding/removing attributes from the payload, etc.).

For example, user applications may be instrumented (e.g., with agents) to forward their trace data to a collector 424 (e.g., OTel collector). Receivers 422 (e.g., OTLP, Prometheus, etc.) may be collecting these traces and/or passing the traces on to the first trace pipeline 410 running in the collector 424.

Before the received trace has an opportunity to be ingested into FSO 420, a grouping of all the spans and/or a grouping of all the traces (e.g., group by trace 418) may be performed in first trace pipeline 410. The traces may be processed by connector 404 to generate events (e.g., BiQ events). This may include processing all the traces and generating a payload from those traces when they are associated with transactional attributes of interest. Again, traces at this point may not have yet been sampled, so no data on these transactional attributes has yet been lost. In some instances, the traces from which events were generated by connector 404 may be excluded from forwarding to the second trace pipeline 412 and/or excluded from being included as a sample in tail sampling 416.

The traces may be forwarded from the first trace pipeline 410 to the second trace pipeline 412. For instance, the traces may be forwarded via forward connector 426 to a forward receiver 428 that is receiving traces from the forward connector 426 for the second trace pipeline 412. The traces may be forwarded as unmodified trace data to the second trace pipeline 412. Sampling (e.g., tail sampling 416) may then be applied to the traces in second trace pipeline 412. The sampled data may be ingested into FSO 420 from the second trace pipeline 412 following sampling.

As for the event payloads generated by connector 404, they may be forwarded to event processor pipeline 414. For example, the event payloads may be forwarded via connector 404 to event receiver 406 that is receiving event payloads for the event processor pipeline 414. Here, transformer 408 may modify (enhance, transform, etc.) the event. For instance, conventional observability protocols may operate within specific semantic conventions (e.g., OTel semantic conventions) and/or include the attributes within the data. Therefore, transformer 408 may filter out and/or remove some of the semantic and/or attribute additions to the data in order to help reduce payload size and/or ameliorate security risks. The transactional event (e.g., modified, unmodified, etc.) may then be ingested to the FSO 420 from the event processor pipeline 414.

In an example implementation, utilize of architecture 400 to mitigate data loss in APM sampling may include a user adding a transaction attribute to the spans in their code in addition to an auto-instrumentation. The user may add specific prefixes to the transactional attribute name (e.g., 'BiQ.CartValue', 'IgnoreTrace', etc.). In some implementations, this may be performed dynamically through dynamic instrumentation of the code. The user may configure a collector 424 (e.g., a common OTel connector) instances so that all spaces for a trace go to the same collector.

The user may deploy an event processor (e.g., BiQ event processor) in the first trace pipeline 410 of collector 424 to extract transactional events (e.g., BiQ events) from a grouped trace before tail sampling 416 is applied. The transactional event may generate processor scrapes of all transactional attributes with a specific prefix (ex: BiQ.CartValue) and generates a transactional event. If no attributes match or if the 'IgnoreTrace' flag is found, then the event generation may be skipped. Additional reasons for generating the transactional event may be if it was defined as part of a business journey. This information may be passed onto the collector 424 through a configuration (e.g., OpAmp configuration).

In instances where the spans end up on different collectors, the event may also contain the span context (trace_id, span_id) and parent_id. The event may further contain a transaction's (e.g., business transaction (BT)) entity ID generated using the information on the starting span of the transaction (e.g., with 'appdynamics.bt.name' or 'parent_id=null'). An event grouper (e.g., BiQ event grouper) step may read the SpanContext and BTEntityID on the event and maintain the event in memory for a short window of time. If any other event comes with the same span context, the events are merged in memory and eventually associated with BTentityID and written to the event store. Grouped transactional events may be passed to an event enhancer (e.g., BiQ event enhancer) where data type conversions, derived attributes (zip code→state) calculations, etc. may be performed and/or new attributes may be added to the event.

Then a utility for monitoring and correlating linear data flow across multiple event sources and/or tracking defined transactional workflows (e.g., Business Journeys) may process the event to generate milestone events across the workflow. Finally, the transactional events may be consumed by metrics data systems to generate comprehensive performance measurements incorporating the transactional attributes.

FIG. 5 illustrates an example of a pipeline configuration 500 for mitigation of data loss from trace sampling. This may be a pipeline configuration 500 utilized after event_generator connector components as outlined in FIG. 4. This may include the three data pipelines for ingesting traces and logs into an FSO utility. For instance, pipeline configuration 500 may include two trace pipelines (e.g., first trace pipeline and second trace pipeline) in addition to an event processor pipeline. The first trace pipeline may be a common traces pipeline for group by trace and transactional event generation (e.g., BiQ events). The second trace pipeline may be a trace pipeline for performing tail sampling and ingesting traces to FSO. Event processor pipeline may be a logs pipeline for transforming and ingesting the transactional events (e.g., BiQ events) to FSO.

Figure 6:
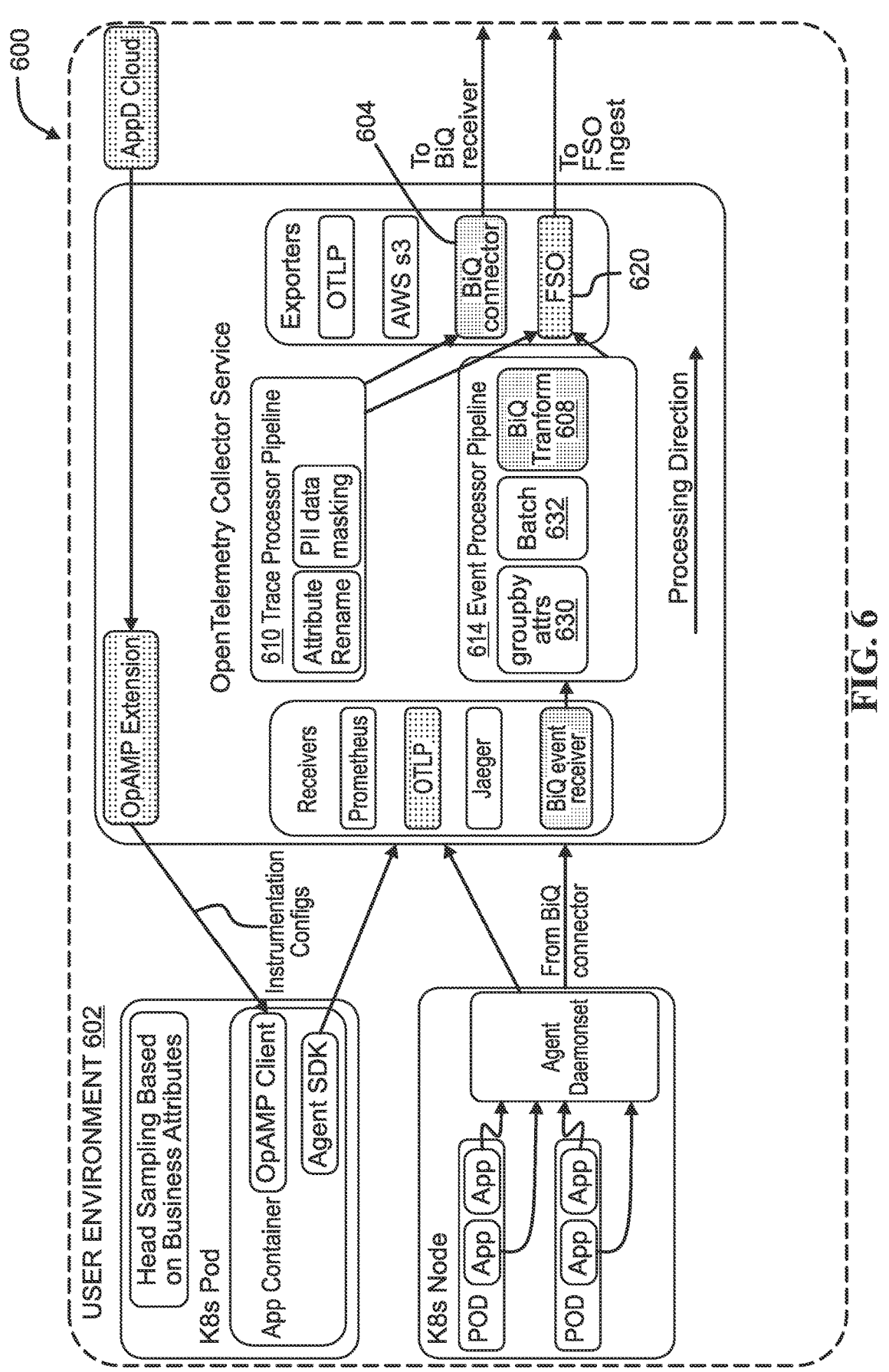
FIG. 6 illustrates another example of an architecture for mitigation of data loss from tail-based sampling of traces.

FIG. 6 illustrates another example of an architecture 600 for mitigation of data loss from tail-based sampling of traces. In contrast to architecture 400 of FIG. 4, architecture 600 may utilize a single trace processor pipeline (e.g., trace processor pipeline 610) and be operable to generate an event from each span and group those smaller events into one bigger event and then send it on to FSO exporter 620 for ingestion into an FSO.

In various implementations, the multi-pipeline approach outlined with respect to architecture 400 may be a memory intensive approach. For example, grouping all the spans together in one trace and then generating the event as well as utilizing two trace pipelines and/or the multi-pipeline forwarding schemes of architecture 400 may be costly in terms of computational resources such as memory, CPU utilization, etc. As such, an alternative architecture, such as architecture 600, may be implemented in resource-limited environments.

For instance, architecture 600 may mitigate the relatively higher-resource demands associated with architecture 400 by excluding the group by trace processor from trace processor pipeline 610. Therefore, transactional events may be generated per span instead of per trace as was the approach in architecture 400. The transactional events generate by the connector 604 in architecture 600 may then by passed to the event processor pipeline 614 (e.g., logs pipeline).

Here, for each span there may be an event generated. Each of these events may be characterized by and/or include one or more identifiers (e.g., trace ID, span ID, other unique identifiers, etc.). For instance, each event may add trace_id and span_id as an attribute. A group by attribute processor 630 may be utilized in conjunction with a batch processor 632 in event processor pipeline 614 to identify and/or group the events together which share a common identifier (e.g., a shared trace ID), thereby merging the multiple events emitted by the connector 604 into a single event before ingesting that merged data into an FSO through FSO exporter 620. This may be a more computational resource efficient strategy that is executed by architecture 400.

In various implementations, architecture 600 may be configured to include an attribute processor. The attribute processor may be utilized to remove semantic convention (e.g., OTel semantic convention) attributes from the events. That is, since the transactional event may include all the trace attributes and some of the semantic convention attributes are not relevant for a transactional metric of interest, these semantic convention attributes may be removed to further reduce the transactional event size before it is ingested to the FSO utility.

It should be noted that, while architecture 600 includes elements that may be utilized to perform head-based sampling in conjunction with tail-based sampling, this is intended as a non-limiting example architecture. In various embodiments, architecture 600 may be utilized for tail-based sampling and the head-based sampling components may de disabled within and/or absent from architecture 600.

Figure 7:
FIG. 7 illustrates an example of a pipeline configuration for mitigation of data loss from trace sampling.

FIG. 7 illustrates an example of a pipeline configuration 700 for mitigation of data loss from trace sampling. This may be a pipeline configuration 700 utilized within architecture 600 of FIG. 6. This may include the two data pipelines for ingesting traces and logs into an FSO utility. For instance, pipeline configuration 700 may include a single trace processor pipeline and an event processor pipeline. The trace processor pipeline may be a trace pipeline for transactional event generation (e.g., BiQ events) from traces/spans. The event processor pipeline may be a logs pipeline for processing transactional events (e.g., BiQ events) and ingesting logs to an FSO utility.

Figure 8:
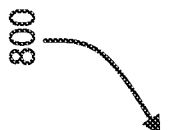
FIG. 8 illustrates an example of a configuration for an attribute processor utilizable for mitigation of data loss from trace sampling.

FIG. 8 illustrates an example of a configuration 800 for an attribute processor utilizable for mitigation of data loss from trace sampling. The configuration 800 may be utilized to remove semantic convention attributes from transactional events prior to ingesting them to an FSO utility. That is, since the transactional event may include all the trace attributes and some of the semantic convention attributes are not relevant for a transactional metric of interest, these semantic convention attributes may be removed utilizing the configuration 800 for an attribute processor in order to further reduce the transactional event size before it is ingested to the FSO utility. This configuration may be utilized with the tail-based sampling approaches and/or with the head-based sampling approaches outlined herein.

Figure 9:
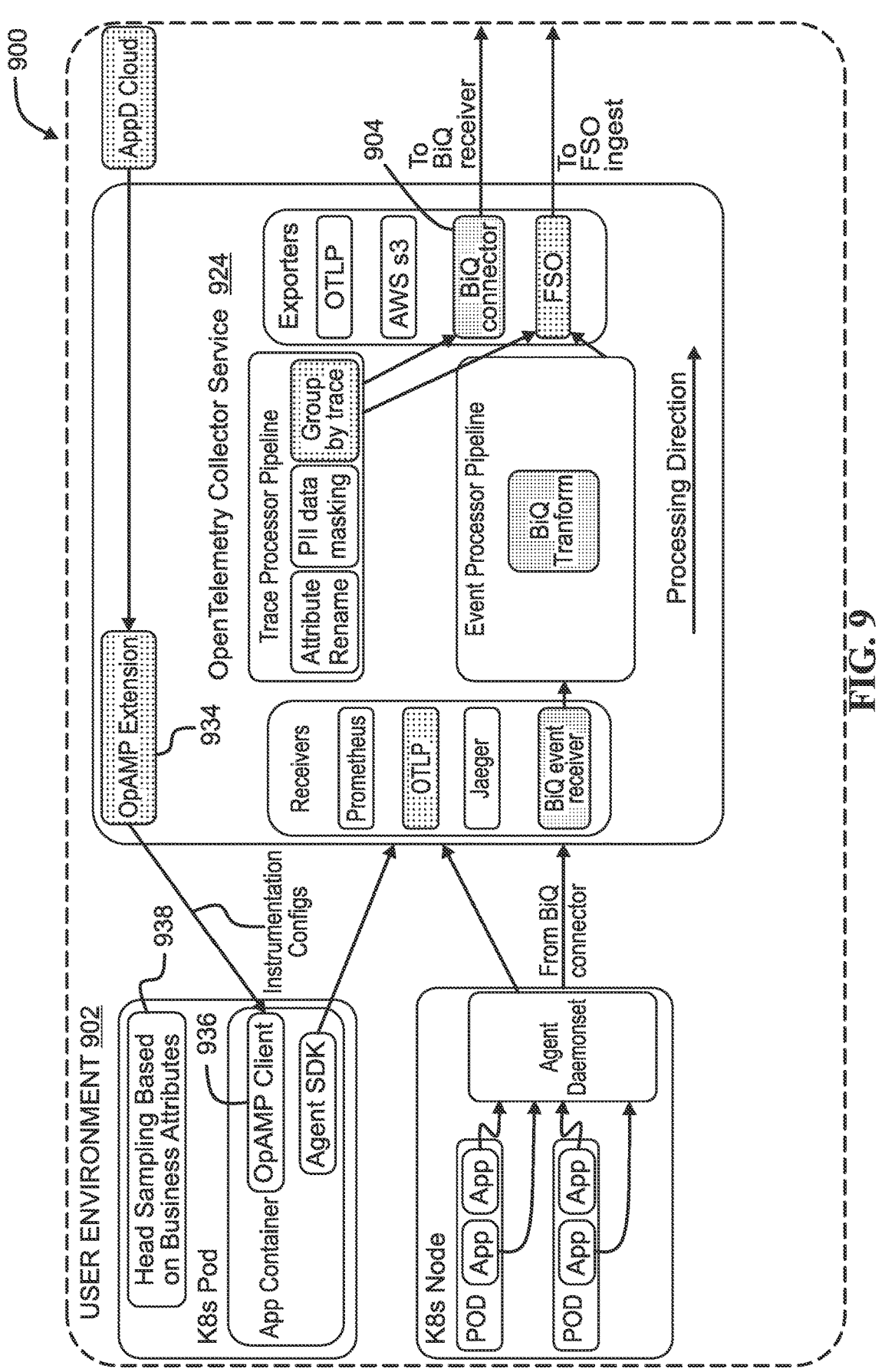
FIG. 9 illustrates an example of an architecture for mitigation of data loss from head-based sampling of traces.

FIG. 9 illustrates an example of an architecture 900 for mitigation of data loss from head-based sampling of traces. In various implementations, head-based sampling may be utilized in conjunction with tail-based sampling, such that users typically employ both strategies. However, in the case of head-based sampling, traces may be sampled at the client side, before reaching a collector (e.g., OTel Collector). As such, architecture 900 may include an extension 934 (e.g., OpAMP extension) running in a collector service 924 (e.g., OTel Collector service) and/or a client 936 (e.g., OpAMP client) running in a user application that are configured to instrument configurations that will be available on the client side at the time of head-based sampling.

For example, client 936 may receive the transactional attribute configurations from the extension 934 running in the collector service 924. The instrumentation configurations may thereby be made available on the client side at the time of sampling. This instrumentation can consist of transactional attributes (e.g., business-related attributes, etc.) which can identify analytics use cases of interest.

In various implementations, there may be an attribute named "sample." This attribute may be set to false in order to convey that the corresponding current trace should not be sampled. Therefore, the traces with transactional attributes will not be sampled even though head-based trace sampling is enabled. These traces may be used in the connector component 904 to further generate the APM platform (e.g., AppDynamics) or FSO platform-specific events in a similar manner to the above-described strategies for generating transactional events in the case of tail-based trace sampling.

Figure 10:
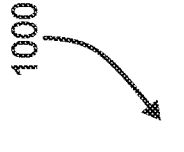
FIG. 10 illustrates an example simplified procedure for mitigation of data loss from trace sampling, in accordance with one or more implementations described herein.

FIG. 10 illustrates an example of a simplified procedure for mitigation of data loss from trace sampling, in accordance with one or more implementations described herein. For example, a non-generic, specifically configured device (e.g., device 200), may perform procedure 1000 (e.g., a method) by executing stored instructions (e.g., sampling mitigation process 248). The procedure 1000 may start at step 1005, and continues to step 1010, where, as described in greater detail above, the device (e.g., a controller, processor, etc.) may obtain a set of OpenTelemetry data generated by instrumenting an online application. For example, OpenTelemetry data may be obtained and/or processed by a connector component prior to ingestion into an observability platform.

Some portion of the set of OpenTelemetry data may include attributes that a user is interested in targeting for observation and/or analytical use. In some instances, the targeted attributes may be identified utilizing an attribute identifier (e.g., a specific prefix added to the attributes name). These attribute identifiers may be utilized to identify the attributes within the set of OpenTelemetry data that are targeted for inclusion in the group of OpenTelemetry data. Traces that include the attributes may be excluded from head-based sampling operations. In this manner, none of these attributes may be excluded from being included in the subsequently formed group of OpenTelemetry data by virtue of being sampled out prior to being made available for incorporation in the group. At step 1015, as detailed above, the device may form a group of OpenTelemetry data associated with a common event and comprising at least a portion of the set of OpenTelemetry data. The common event may be the inclusion of a targeted attribute in the data. For example, a processor may scrape all attributes with the attribute identifier and generate an event common to those attributes. In some instances, the scrapes attributes from within the group of OpenTelemetry data may be mapped to an identifier of a transaction entity associated with the attribute.

Forming the group of OpenTelemetry data may include grouping OpenTelemetry data that includes a targeted attribute per trace from the set of OpenTelemetry data. Alternatively, or additionally, forming the group of OpenTelemetry data may include grouping OpenTelemetry data that includes a targeted attribute per span from the set of Open-Telemetry data.

At step 1020, the device may derive, using the group of OpenTelemetry data, information for display to a user interface regarding the event. Deriving the information for display to the user may include modifying the group of Open-Telemetry data to generate modified OpenTemetry data (e.g., removing attributes, adding attributes, deriving attributes, converting data types, etc.) and/or providing the modified OpenTemetry data to an observability platform monitoring the online application.

In some instances, this modification may include the removal of semantic convention attributes to further reduce the transactional event size before it is ingested to the FSO utility. In some instances, this modification may include masking sensitive data within the group of OpenTelemetry data from inclusion in information for display to a user. In addition, deriving the information for display may include generating an event in a transactional workflow based on the group of OpenTelemetry data.

At step 1025, as detailed above, the device may provide the group of OpenTelemetry data for sampling, after deriving the information for display. For example, data from the set of OpenTelemetry data and/or data from the group of OpenTelemetry data may be subjected to sampling such as tail based sampling. However, since the data related to a targeted attribute was separately captured it will not be lost through sampling.

Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, allow users to enable head-based sampling, tail-based sampling, and/or head-based and tail-based sampling at the same time without losing granularity of transactional attribute data. These techniques can be implemented in FSO/CNAO (e.g., observability platforms) for transactional event ingestion from a user's applications. These techniques may provide flexibility to ingest APM events (e.g., AppDynamics events) directly from a telemetry collector (e.g., OTel collector. The resulting events can be processed and derived from open telemetry-supported data types such as logs, metrics, or traces. When trace sampling is enabled, these techniques may facilitate event ingestion before sampling providing more accurate results for analytical purposes. The events resulting from these techniques can be further mapped to APM/FSO entities which can explore more capabilities for the advanced use cases such as workflow journeys. Moreover, these techniques may be utilized to reduce event size by narrowing the list of transactional attributes i.e., event attributes by filtering out the semantic convention attributes.

Therefore, these techniques facilitate all levels and types of trace sampling while still preserving the full breadth of transactional attribute data for transactional metrics of interest. Consequently, these techniques deliver complete transactional visibility and/or unbiased data transactional attribute data sets that ensure rapid identification and resolution of issues while preserving the ability of users to control operational costs through sampling strategies. As such, these techniques may result in increased APM system and/or monitored application performance and user experience as well as decreased operational risks.

While there have been shown and described illustrative implementations that provide for mitigation of data loss from trace sampling, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

obtaining, by a collector device, a set of OpenTelemetry data generated by instrumenting an online application, wherein:

the collector device comprises a multi-pipeline configuration including a trace pipeline configured to process the set of OpenTelemetry data, a connector configured to generate event payloads from grouped OpenTelemetry data, and an event pipeline configured to modify event payloads for display, and at least a portion of the set of OpenTelemetry data is provided for one or both of tail based sampling or head based sampling;

forming, by the collector device in the trace pipeline, a group of OpenTelemetry data associated with a common event and comprising at least a portion of the set of OpenTelemetry data;

deriving, by the collector device and using the group of OpenTelemetry data, information for display to a user interface regarding the common event, wherein deriving the information comprises:

forming, using the connector and the group of Open-Telemetry data, an event payload, and modifying, using the event pipeline, the event payload to derive the information;

when at least the portion of the set of OpenTelemetry data is provided for head based sampling:

excluding, by the collector device, one or more traces of the set of OpenTelemetry data from undergoing head based sampling, before obtaining the set of OpenTelemetry data; and when at least the portion of the set of OpenTelemetry data is provided for tail based sampling:

providing, by the collector device, the group of Open-
Telemetry data for tail based sampling, after deriving
the information for display.

2. The method as in claim 1, further comprising:

utilizing an attribute identifier to identify attributes within
the set of OpenTelemetry data that are targeted for
inclusion in the group of OpenTelemetry data.

3. The method as in claim 2, further comprising:

excluding, based on the attribute identifier, traces that
include the attributes from a head sampling operation.

4. The method as in claim 1, further comprising:

mapping an attribute within the group of OpenTelemetry
data to an identifier of a transaction entity associated
with the attribute.

5. The method as in claim 1, wherein deriving the
information for display to the user interface comprises:

providing the information to an observability platform
monitoring the online application.

6. The method as in claim 1, wherein modifying, using the
event pipeline, the event payload includes masking sensitive
data within the event payload.

7. The method as in claim 1, wherein forming the group
of OpenTelemetry data includes grouping OpenTelemetry
data that includes a targeted attribute per trace from the set
of OpenTelemetry data.

8. The method as in claim 1, wherein forming the group
of OpenTelemetry data includes grouping OpenTelemetry
data that includes a targeted attribute per span from the set
of OpenTelemetry data.

9. The method as in claim 1, wherein the common event
is an inclusion of a targeted attribute.

10. The method as in claim 1, wherein deriving the
information for display includes generating an event in a
transactional workflow based on the group of OpenTelem-
etry data.

11. An apparatus, comprising:

one or more network interfaces;

a processor coupled to the one or more network interfaces
and configured to execute one or more processes; and a memory configured to store a process that is executable
by the processor, the process when executed configured
to:

obtain a set of OpenTelemetry data generated by instru-
menting an online application, wherein at least a
portion of the set of OpenTelemetry data is provided
for one or both of tail based sampling or head based
sampling;

form, using a trace pipeline configured to process the
set of OpenTelemetry data, a group of OpenTelem-
etry data associated with a common event and com-
prising at least a portion of the set of OpenTelemetry
data;

derive, using the group of OpenTelemetry data, a
connector configured to generate event payloads
from grouped OpenTelemetry data, and an event
pipeline configured to modify event payloads for
display, information for display to a user interface
regarding the common event, wherein to derive the
information comprises to:

form, using the connector and the group of Open-
Telemetry data, an event payload, and modify, using the event pipeline, the event payload
to derive the information;

when at least the portion of the set of OpenTelemetry
data is provided for head based sampling:

exclude one or more traces of the set of OpenTe-
lemetry data from undergoing head based sam-
pling, before obtaining the set of OpenTelemetry
data; and when at least the portion of the set of OpenTelemetry
data is provided for tail based sampling:

provide the group of OpenTelemetry data for tail
based sampling, after deriving the information for
display.

12. The apparatus as in claim 11, the process when
executed further configured to:

utilize an attribute identifier to identify attributes within
the set of OpenTelemetry data that are targeted for
inclusion in the group of OpenTelemetry data.

13. The apparatus as in claim 12, the process when
executed further configured to:

exclude, based on the attribute identifier, traces that
include the attributes from a head sampling operation.

14. The apparatus as in claim 11, the process when
executed further configured to:

map an attribute within the group of OpenTelemetry data
to an identifier of a transaction entity associated with
the attribute.

15. The apparatus as in claim 11, the process when
executed further configured to derive the information for
display to the user interface by:

providing the information to an observability platform
monitoring the online application.

16. The apparatus as in claim 11, wherein modifying,
using the event pipeline, the event payload includes masking
sensitive data within the event payload.

17. The apparatus as in claim 11, the process when
executed further configured to form the group of OpenTe-
lemetry data by grouping OpenTelemetry data that includes
a targeted attribute per trace from the set of OpenTelemetry
data.

18. The apparatus as in claim 11, the process when
executed further configured to form the group of OpenTe-
lemetry data by grouping OpenTelemetry data that includes
a targeted attribute per span from the set of OpenTelemetry
data.

19. The apparatus as in claim 11, wherein the common
event is an inclusion of a targeted attribute.

20. A tangible, non-transitory, computer-readable medium
storing program instructions that cause a device to execute
a process comprising:

obtaining a set of OpenTelemetry data generated by
instrumenting an online application, wherein at least a
portion of the set of OpenTelemetry data is provided for
one or both of tail based sampling or head based
sampling;

forming, using a trace pipeline configured to process the
set of OpenTelemetry data, a group of OpenTelemetry
data associated with a common event and comprising at
least a portion of the set of OpenTelemetry data;

deriving, using the group of OpenTelemetry data, a con-
nector configured to generate event payloads from
grouped OpenTelemetry data, and an event pipeline
configured to modify event payloads for display, infor-
mation for display to a user interface regarding the
common event, wherein deriving the information com-
prises:

forming, using the connector and the group of Open-
Telemetry data, an event payload, and modifying, using the event pipeline, the event payload
to derive the information;

when at least the portion of the set of OpenTelemetry data is provided for head based sampling:
    excluding one or more traces of the set of OpenTelemetry data from undergoing head based sampling, before obtaining the set of OpenTelemetry data; and when at least the portion of the set of OpenTelemetry data is provided for tail based sampling:
    providing the group of OpenTelemetry data for tail based sampling, after deriving the information for display.

* * * * *